United States Patent
Collier et al.

(10) Patent No.: US 10,447,808 B2
(45) Date of Patent: Oct. 15, 2019

(54) SYSTEMS AND METHODS FOR SELECTING A PORTION OF A CONTENT SEGMENT TO DISTRIBUTE VIA AN ONLINE PLATFORM

(71) Applicant: Disney Enterprises, Inc., Burbank, CA (US)

(72) Inventors: Benjamin Collier, Burbank, CA (US); Michael Woods, Burbank, CA (US); Ryan Lissack, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/115,013

(22) Filed: Aug. 28, 2018

(65) Prior Publication Data

US 2018/0367640 A1 Dec. 20, 2018

Related U.S. Application Data

(63) Continuation of application No. 15/134,314, filed on Apr. 20, 2016, now Pat. No. 10,075,556.

(51) Int. Cl.
*G06F 15/16* (2006.01)
*H04L 29/08* (2006.01)
*H04L 29/06* (2006.01)

(52) U.S. Cl.
CPC .......... *H04L 67/32* (2013.01); *H04L 65/4076* (2013.01); *H04L 65/60* (2013.01); *H04L 65/80* (2013.01); *H04L 67/1097* (2013.01); *H04L 67/22* (2013.01); *H04L 67/42* (2013.01)

(58) Field of Classification Search
CPC ..... H04L 67/32; H04L 67/1097; H04L 67/22; H04L 67/42; H04L 65/4076; H04L 65/60; H04L 65/80
See application file for complete search history.

(56) References Cited

U.S. PATENT DOCUMENTS

| | | |
|---|---|---|
| 9,165,072 B1 | 10/2015 | Mayo |
| 9,799,373 B2 | 10/2017 | Song |
| 2002/0040404 A1 | 4/2002 | Lahr |
| 2009/0157697 A1 | 6/2009 | Conway |
| 2010/0023397 A1 | 1/2010 | Goldman |
| 2010/0241757 A1 | 9/2010 | Hu |
| 2013/0086489 A1* | 4/2013 | Fleischman ............ G06Q 30/02 715/753 |
| 2013/0259399 A1 | 10/2013 | Ho |
| 2014/0067825 A1* | 3/2014 | Oztaskent .......... H04N 21/4782 707/748 |
| 2015/0006280 A1 | 1/2015 | Ruiz |

(Continued)

OTHER PUBLICATIONS

Horton, Chris, Paid Advertising 101: Understanding Search and Display Advertising, Nov. 4, 2015, Social Media Today.com (Year: 2015).

*Primary Examiner* — Jonathan A Bui
(74) *Attorney, Agent, or Firm* — Esplin & Associates, PC

(57) ABSTRACT

A portion of a content segment to distribute via an online platform may be selected. A retention metric may be obtained. Consumer engagement during the content segment may be quantified. The portion of the content segment to distribute via a second online platform to direct consumers to the content segment on the first online platform may be determined. The system may distribute the portion of the content segment via the second online platform.

20 Claims, 4 Drawing Sheets

(56) References Cited

U.S. PATENT DOCUMENTS

| | | |
|---|---|---|
| 2015/0193814 A1 | 7/2015 | Eppinger |
| 2016/0119633 A1* | 4/2016 | Neuman ................ H04N 19/40 |
| | | 375/240.02 |
| 2016/0149956 A1* | 5/2016 | Birnbaum ............. H04L 63/101 |
| | | 726/1 |
| 2016/0249116 A1* | 8/2016 | Harb .................. H04N 21/8549 |
| 2017/0124593 A1 | 5/2017 | Nickerson |
| 2017/0133054 A1 | 5/2017 | Song |
| 2017/0149704 A1* | 5/2017 | Batiz .................... H04L 51/046 |
| 2017/0163701 A1* | 6/2017 | Ashkan ............ H04N 21/44204 |
| 2017/0187770 A1* | 6/2017 | Paul ....................... H04L 65/60 |
| 2017/0187772 A1* | 6/2017 | Paul ..................... H04L 65/601 |
| 2018/0367640 A1 | 12/2018 | Collier |

\* cited by examiner

SYSTEMS AND METHODS FOR SELECTING A PORTION OF A CONTENT SEGMENT TO DISTRIBUTE VIA AN ONLINE PLATFORM

FIELD

The disclosure relates to systems and methods for selecting a portion of a content segment to distribute via an online platform.

BACKGROUND

Many online platforms exist for distributing and sharing online content. Individual platforms may have restrictions and/or requirements for posting and/or sharing content to the platforms. For example, one platform may only allow posting and/or sharing a video with a maximum length of six seconds, while another platform may only allow posting and/or sharing a video with a maximum length of ten seconds. Content segments may be longer than the maximum length allowed by some platforms.

SUMMARY

One aspect of the disclosure relates to a system configured for selecting a portion of a content segment to distribute via an online platform. A content segment may include one or more of an online video content, a social media content, an online photo content, audio content, and/or other online content. A portion of the content segment may include less than the content segment as a whole. For example, a portion of the content segment may include a snippet of an online video content, such as a preview of the online video content, an image from online video content, an image from a collection of images, and/or other portions of the content segment. An online platform may include a networking platform a media platform, and/or other online platforms. The online platform may include the content segment and/or make the content segment available for consumption. For example, an online platform may include YouTube, Facebook, Twitter, Pinterest, LinkedIn, Google+, Flickr, Tumblr, Blogger, Vine, Instagram, Snapchat, Hulu, Maker.TV and/or other online platforms. The online platform may include content segments that were previously distributed via a television broadcast, including satellite television, network television, a live broadcast, and/or other content segments that were previously distributed via a broadcast. In exemplary implementations, the system may obtain a retention metric as a function of time for the content segment. The content segment may be available to consumers via a first online platform. Individual consumers may view the content segment on the first platform for varying lengths of time. As such, consumer engagement of the content segment may vary from consumer to consumer. The retention metric may quantify consumer engagement during consumption of the content segment on the first platform. The retention metric may be based upon consumer generated content on one or more other platforms other than the first platform contemporaneously with a broadcast distribution of the content segment. In response to the retention metric, the system may determine the portion of the content segment to distribute via a second online platform to direct consumers to the content segment on the first platform. The portion of the content segment may be distributed to the second platform to entice consumers to view the content segment on the first platform. The system may distribute the portion of the content segment via the second platform. The portion of the content segment may be posted on a wall, channel, feed, board, or other section associated with the second platform.

In some implementations, the system may include one or more servers. The server(s) may be configured to communicate with one or more client computing platforms according to a client/server architecture. The consumers may access the system via client computing platform(s). The server(s) may be configured to execute computer readable instructions. The computer readable instructions may include one or more of a metric component, a content determination component, a content distribution component, a consumer response component, a platform component, and/or other components.

The metric component may be configured to access and/or obtain consumer engagement information associated with the content segment on the first platform. Consumer engagement information may be stored by the server(s), the client computing platform(s), and/or other storage locations. Consumer engagement information may include consumer viewing habits (e.g., how long a consumer views content, how often the consumer views the content, how often the consumer views related content, and/or other consumer viewing habits), consumer responsiveness and/or consumer activity (e.g., commenting, sharing, posting, and/or other consumer responsiveness and/or consumer activities), information identifying consumers (e.g., a username or handle, a number, an identifier, and/or other consumer identifying information), account/profile information, subscription information, online content subscriptions associated with the consumer, demographic information associated with consumer, and/or other information related to consumers and/or consumer engagement. For example, consumer generated content on a microblogging platform of a content segment from a broadcast may indicate which portions of the content segment from the broadcast appealed to which consumers.

The content component may be configured to determine the portion of the content segment to distribute to the second platform. The determination may be based upon the retention metric. The determination may be based upon one or more parameters including, but not limited to, talent associated with the content segment, consumer demographics associated with the content segment, a topic associated with the content segment, an identification of a second online platform on which the portion of the content segment may be distributed to, and/or other parameters.

The content distribution component may be configured to distribute the portion of the content segment to the second platform. Consumers may access and/or consume the content segment on the first platform from the portion of the content segment that may be distributed to the second platform.

The consumer response component may be configured to track consumer response to the portion of the content segment by consumers that consume the portion of the content segment on the second platform. Tracking consumer response to the portion of the content segment on the second platform may include tracking whether consumers up vote and/or promote the portion of the content segment on the second platform and/or which consumers up vote and/or promote the portion of the content segment on the second platform. Tracking which consumers up vote and/or promote the portion of the content segment on the second platform may include obtaining some of all of the user information for consumers held in online profiles associated with the consumers on the second platform. The user information may include one or more of the name, username, interests, demographic information, and/or other online profile information. Up voting the portion of the content segment may include "liking", rating, thumbs-upping, commenting, and/or otherwise up voting the portion of the content segment on the second platform. Promoting the portion of the content segment may include sharing, posting, linking, emailing, and/or otherwise promoting the portion of the content segment on the second platform. Promoting the portion of the content segment may include promoting the portion of the content segment on another platform separate from the second platform for other consumers to view.

The platform component may be configured to determine the second platform to distribute some portion of the content segment. The determination may be based upon the content segment. As described above, individual second platforms may have restrictions and/or requirements for file size and/or length of content that may be posted and/or shared on the individual platforms. As such, a portion of a content segment may be distributed to individual platforms based upon a size and/or length of the portion of the content segment. The determination may be based upon one or more parameters including, but not limited to talent associated with the content segment, consumer demographics associated with the second platform, a topic associated with the content segment, and/or other parameters associated with the content segment and/or the second platform.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
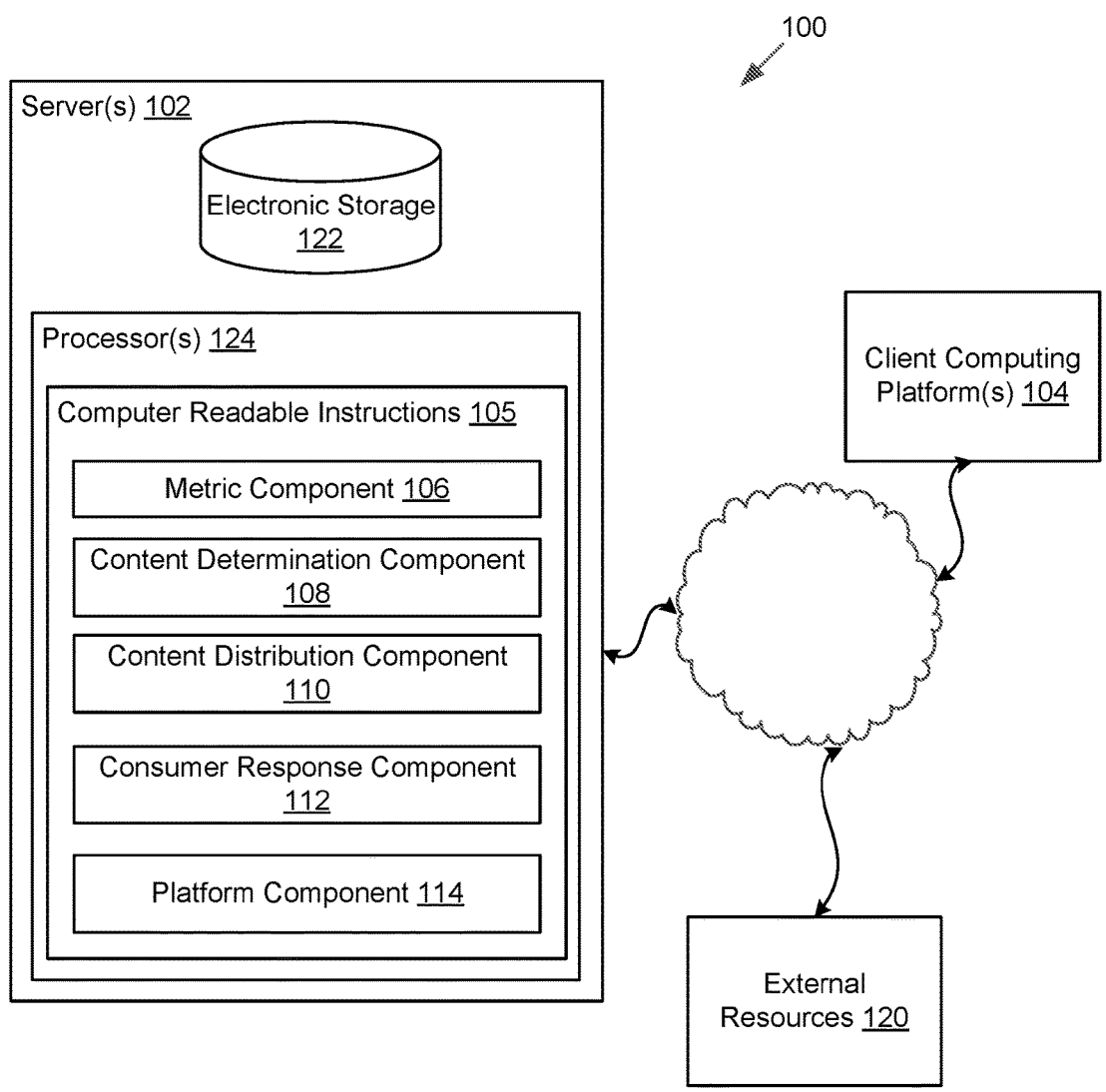
FIG. 1 illustrates a system configured for selecting a portion of a content segment to distribute via an online platform, in accordance with one or more implementations.

FIG. 1 illustrates a system 100 configured for selecting a portion of a content segment to distribute via an online platform, in accordance with one or more implementations. A content segment may include one or more of an online video content, a social media content, an online photo content, audio content, and/or other online content. A portion of the content segment may include less than the content segment as a whole. For example, a portion of the content segment may include a snippet of an online video content, such as a preview of the online video content, an image from online video content, an image from a collection of images, and/or other portions of the content segment. An online platform may include a networking platform a media platform, and/or other online platforms. The online platform may include the content segment and/or make the content segment available for consumption. For example, an online platform may include YouTube, Facebook, Twitter, Pinterest, LinkedIn, Google+, Flickr, Tumblr, Blogger, Vine, Instagram, Snapchat, Hulu, Maker.TV and/or other online platforms. The online platform may include content segments that were previously distributed via a television broadcast, including satellite television, network television, a live broadcast, and/or other content segments that were previously distributed via a broadcast.

In exemplary implementations, system 100 may obtain a retention metric as a function of time for the content segment. The content segment may be available to consumers via a first online platform. Individual consumers may view the content segment on the first platform for varying lengths of time. As such, consumer engagement of the content segment may vary from consumer to consumer. The retention metric may quantify consumer engagement during consumption of the content segment on the first platform. The retention metric may be based upon consumer generated content on one or more other platforms other than the first platform contemporaneously with a broadcast distribution of the content segment.

In response to the retention metric, system 100 may determine the portion of the content segment to distribute via a second online platform to direct consumers to the content segment on the first platform. The portion of the content segment may be distributed to the second platform to entice consumers to view the content segment on the first platform.

System 100 may distribute the portion of the content segment via the second platform. The portion of the content segment may be posted on a wall, channel, feed, board, or other section associated with the second platform.

In some implementations, system 100 may include one or more servers 102. Server(s) 102 may be configured to communicate with one or more client computing platforms 104 according to a client/server architecture. The consumers may access system 100 via client computing platform(s) 104. Server(s) 102 may be configured to execute computer readable instructions 105. Computer readable instructions 105 may include one or more of metric component 106, content determination component 108, content distribution component 110, consumer response component 112, platform component 114, and/or other components.

Metric component 106 may be configured to access and/or obtain consumer engagement information associated with the content segment on the first platform. Consumer engagement information may be stored by server(s) 102, client computing platforms 104, and/or other storage locations. Consumer engagement information may include consumer viewing habits during a broadcast and/or on the first platform (e.g., how long a consumer views content, how often the consumer views the content, how often the consumer views related content, and/or other consumer viewing habits), consumer responsiveness and/or consumer activity during the broadcast and/or on the first platform (e.g., commenting, sharing, posting, and/or other consumer responsiveness and/or consumer activities), information identifying consumers (e.g., a username or handle, a number, an identifier, and/or other consumer identifying information), account/profile information, subscription information, online content subscriptions associated with the consumer, demographic information associated with consumer, and/or other information related to consumers and/or consumer engagement. For example, consumer generated content on a microblogging platform of a content segment from a broadcast may indicate which portions of the content segment from the broadcast appealed to which consumers.

Figure 2:
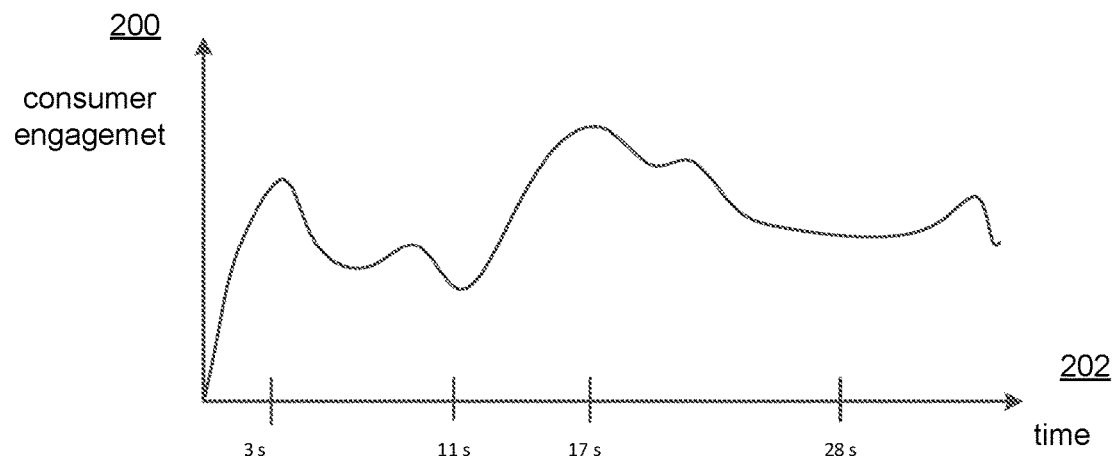
FIG. 2 illustrates an exemplary graph depicting consumer engagement of a content segment over time, in accordance with one or more implementations.

Referring to FIG. 2, an exemplary graph of a retention metric is shown depicting consumer engagement 200 of the content segment on the first platform over span of time 202. As shown in FIG. 2, a graph of consumer engagement 200 for the content segment is plotted over span of time 202 for the content segment. Consumer engagement 200 for the content segment may reach a first peak at 3 seconds, while consumer engagement 200 may reach the lowest valley at 11 seconds. This may be due to consumers losing interest in the content or subject matter for the content segment. Consumer engagement may then reach the highest peak at 17 seconds, and consumer engagement may plateau around 28 seconds of the content segment. While seconds have been used as a unit of time in FIG. 2, this is for exemplary purposes only and is not meant to be a limitation of this disclosure. Time 202 may include any unit of time including minutes, hours, and/or other units of time.

Returning to FIG. 1, content component 108 may be configured to determine the portion of the content segment to distribute to the second platform. The determination may be based upon the retention metric. The determination may be based upon one or more parameters including, but not limited to, talent associated with the content segment, consumer demographics associated with the content segment, a topic associated with the content segment, an identification of a second online platform on which the portion of the content segment may be distributed to, and/or other parameters.

Individual second platforms may have restrictions and/or requirements for file size and/or length of content that may be posted and/or shared on the individual second platform. As such, a portion of a content segment may be shared to individual second platforms based upon consumer engagement at different points in time of the content segment and/or the second platform to which the portion of the content segment may be distributed. For example, the best 6 second portion of the content segment, 10 second portion of the content segment, and/or 20 second portion of the content segment may overlap and/or may be different portions of the content segment depending upon consumer engagement at various points in time of the content segment and/or the parameters listed above. Consumers may access and/or consume the content segment on the first platform from individual second platforms that the portion of the content is distributed to based upon identification of the individual second platforms.

The parameters may be described and/or indicated in the form of metadata associated with the content segment. Metadata associated with the content segment may include a set of data that describes and/or indicates information about the content segment. Examples of metadata associated with the content segment may include channel metadata (e.g., title, description, search engine optimization keywords, thumbnails, the content segment file, the publish date of the content segment, how many times the content segment has been viewed, a playlist associated with the content segment, consumer retention, trending topics, and/or other channel metadata), file metadata (e.g., file type, file size, resolution, encoding format, bit rate, and/or other file metadata), content metadata, contextual metadata, and/or other metadata associated with the content segment.

Determining the portion of the content segment to distribute to the second platform may be based upon talent associated with the content segment. Talent associated with the content segment may include information relating to talent and/or objects included and/or featured within the content segment. An artist may include one or more of a public figure (e.g., an actor and/or actress, a singer and/or band, a comedian, an athlete, and/or other public figures), a narrator, a performer, a musician, a vocalist, a fictional character, an animated character, and/or other artists included and/or featured within the content segment. The talent associated with the content segment may be included within just a portion of the content segment or may be featured within the entire content segment. For example, the content segment may feature a comedian, while a portion of the content segment may include a singer. Talent associated with the content segment may be described and/or indicated by the metadata associated with the content segment (e.g., channel metadata and/or other metadata).

Determining the portion of the content segment to distribute to the second platform may be based upon consumer demographics associated with the content segment. Consumer demographics associated with the content segment may include information relating to one or more of information and/or statistics related to consumer population of the content segment. Examples of consumer demographics may include age, gender, race, ethnicity, occupation, income level, education level, employment status, geographic location, marital status, language, and/or other demographic information. A portion of the content segment may appeal to a particular consumer based upon consumer demographics. For example, the content segment including an animated character may be more appealing to a young consumer demographic versus an adult consumer demographic. Consumer demographics associated with the content segment may be described and/or indicated by the metadata associated with the content segment (e.g., content metadata and/or other metadata).

Determining the portion of the content segment to distribute to the second platform may be based upon a topic associated with the content segment. A topic associated with the content segment may include information relating to the topic and/or subject matter of the content segment. Examples of a topic may include one or more of a genre (e.g., comedy, drama, thriller, action, theatrical, musical, sports, and/or other genres, any of which may include subgenres), a particular subject matter (e.g., political, painting, do-it-yourself, and/or other subject matters), a title, a description, tags, commentary, and/or other topics associated with the content segment. For example, the content segment may include a comedian reciting jokes about politics. A topic associated with the content segment may be described and/or indicated by the metadata associated with the content segment (e.g., channel metadata, content metadata, contextual metadata, and/or other metadata).

Identification of the second platform may include general information relating to the second platform. Information relating to the second platform may include consumer demographics associated with the second platform, trending topics on the second platform, restrictions and/or requirements associated with the second platform, and/or other general information. For example, one or more second platforms may only accept content segments (or portions of content segments) that meet particular criteria. The criteria may include file type (e.g., .JPG, .PNG, .MOV, .MPEG4, .MP4, .AVI, .WMV, .MPEGPS, .FLV., 3GPP, and/or other file types), file size, bit rate, and/or other criteria.

For example, Vine may accept content segments with a maximum length of six seconds, while Snapchat may accept content segments with a maximum length of ten seconds. In another example, a topic associated with the content segment may include an animated character, which may appeal more to a young consumer demographic than an adult consumer demographic. Identification of a second platform may be based upon a second platform with a younger consumer demographic, versus a second platform with a more adult consumer demographic. Another example may include a topic including a particular geographic location and/or region (e.g., China). Identification of a second platform may be based upon identifying a second platform used in that particular geographic location and/or region.

Content distribution component 110 may be configured to distribute the portion of the content segment to the second platform. Consumers may access and/or consume the content segment on the first platform from the portion of the content segment that may be distributed to the second platform.

Consumer response component 112 may be configured to track consumer response to the portion of the content segment by consumers that consume the portion of the content segment on the second platform. Tracking consumer response to the portion of the content segment on the second platform may include tracking whether consumers up vote and/or promote the portion of the content segment on the second platform and/or which consumers up vote and/or promote the portion of the content segment on the second platform. Tracking which consumers up vote and/or promote the portion of the content segment on the second platform may include obtaining some of all of the user information for consumers held in online profiles associated with the consumers on the second platform. The user information may include one or more of the name, username, interests, demographic information, and/or other online profile information. Up voting the portion of the content segment may include "liking", rating, thumbs-upping, commenting, and/or otherwise up voting the portion of the content segment on the second platform. Promoting the portion of the content segment may include sharing, posting, linking, emailing, and/or otherwise promoting the portion of the content segment on the second platform. Promoting the portion of the content segment may include promoting the portion of the content segment on another platform separate from the second platform for other consumers to view.

Tracking consumer response to the portion of the content segment by consumers that consume the portion of the content segment on the second platform may include tracking whether the consumers that consume the portion of the content segment on the second platform subsequently consume the content segment on the first platform. Tracking whether the consumers that consume the portion of the content segment on the second platform subsequently consume the content segment on the first platform may include tracking whether consumers follow (e.g., click) a link associated with the portion of the content segment on the second platform. Following the link associated with the portion of the content segment on the second platform may redirect the consumer to the content segment on the first platform. Redirecting the consumer to the first platform may include redirecting the consumer within the same application as the second platform, redirecting the consumer via a separate pop-up window, and/or redirecting the consumer in a separate application such that the consumer may view the content segment on the first platform. Tracking consumer response to the portion of the content segment by consumers that consume the portion of the content segment on the second platform may include tracking which consumers that consume the portion of the content segment on the second platform subsequently consume the content segment on the first platform based upon profile information associated with the consumer on the second platform.

Tracking response to the portion of the content segment by consumers that consume the portion of the content segment on the second platform may include tracking whether the consumers that consume the portion of the content segment on the second platform subsequently respond to a call to action within the content segment on the first platform. A call to action within the content segment on the first platform may include prompting the consumer what to do next directly within the content segment and/or via annotations (e.g., popup annotations, text reminding consumers to subscribe to a channel, comments on and/or within the content segment, instructions to view a related content segment, and/or other annotations), advertisement overlays during consumption of the content segment, and/or other call to actions within the content segment on the first platform. Tracking response to the portion of the content segment by consumers that consume the portion of the content segment on the second platform may include tracking which consumers that consume the portion of the content segment on the second platform subsequently respond to a call to action within the content segment on the first platform based upon profile information associated with the consumer on the second platform and/or profile information associated with the consumer on the first platform.

Tracking response to the portion of the content segment by consumers that consume the portion of the content segment on the second platform may include tracking an amount of the content segment consumed by the individual consumers that consume the portion of the content segment on the second platform. Tracking the amount of the content segment consumed by the individual consumers that consume the portion of the content segment on the second platform may include tracking an amount of time the individual consumers view the content segment on the first platform, how many times the individual consumers view the content segment on the first platform, whether the individual consumers skip to particular parts of the content segment, and/or otherwise tracking the amount of the content segment individual consumers view.

Platform component 114 may be configured to determine the second platform to distribute some portion of the content segment. The determination may be based upon the content segment. As described above, individual second platforms may have restrictions and/or requirements for file size and/or length of content that may be posted and/or shared on the individual platforms. As such, a portion of a content segment may be distributed to individual platforms based upon a size and/or length of the portion of the content segment. The determination may be based upon one or more parameters including, but not limited to talent associated with the content segment, consumer demographics associated with the second platform, a topic associated with the content segment, and/or other parameters associated with the content segment and/or the second platform.

Determining the second platform may be based upon talent associated with the content segment. As described above, talent associated with the content segment may include information relating to talent and/or objects included and/or featured within the content segment. An artist may include one or more of a public figure (e.g., an actor and/or actress, a singer and/or band, a comedian, an athlete, and/or other public figures), a narrator, a performer, a vocalist, a fictional character, an animated character, and/or other artist included and/or featured within the content segment. The talent associated with the content segment may be included within the content segment for a portion of the content segment or may be featured within the entire content segment. For example, the content segment may feature a comedian, while a portion of the content segment may include an athlete. Talent associated with the content segment may be described and/or indicated by the metadata associated with the content segment.

Determining the second platform may be based upon consumer demographics associated with the second platform. Consumer demographics associated with the second platform may include information relating to one or more of information and/or statistics related to a consumer population of the online platform, as reflected by consumer profiles associated with the second platform. Examples of consumer demographics may include age, gender, race, ethnicity, occupation, income level, education level, employment status, geographic location, marital status, language, and/or other demographic information. A portion of the content segment may appeal to a particular consumer based upon consumer demographics. For example, the content segment including an animated character may appeal more to a younger consumer demographic than an adult consumer demographic. As such, it may be determined to distribute the content segment to a second platform corresponding to a younger consumer demographics.

Determining the second platform may be based upon a topic associated with the content segment. As described above, a topic associated with the content segment may include information relating to the topic and/or subject matter of the content segment. Examples of a topic may include one or more of a genre (e.g., comedy, drama, thriller, action, theatrical, musical, sports, and/or other genres, any of which may include subgenres), a particular subject matter (e.g., political, painting, do-it-yourself, and/or other subject matters), a title, a description, tags, commentary, an amount of content, and/or other topics associated with the content segment. For example, the content segment may include a country singer covering a pop song. A topic associated with the content segment may be described and/or indicated by the metadata associated with the content segment.

Determining the second platform may be based upon a length of time of the portion of the content segment. As described above, individual platforms may have individual requirements for file size and/or length of content that may be posted and/or shared on the platform. As such, a portion of a content segment may be distributed to individual platforms based upon a size and/or length of the portion of the content segment. For example, if the portion of the content segment is six seconds, the portion of the content segment may be distributed to Vine (as Vine allows for a maximum length of six second content segments). If the portion of the content segment is ten seconds, the portion of the content segment may be distributed to Snapchat (as Snapchat allows for a maximum length of ten second content segments).

In some implementations, metric component 106 may be configured to obtain a retention metric as a function of time for a second content segment on the first platform. The second content segment on the first platform may be the same content segment on the first platform or a different content segment on the first platform. A similar graph of the retention metric as FIG. 2 may be depicted to show consumer engagement over a span of time for the second content segment available on the first platform.

In some implementations, content determination component 108 may be configured to determine a portion of the second content segment to distribute via the second platform to direct consumers to the second content segment on the first platform. The determination may be based upon the retention metric for the second content segment and the tracking of consumer response to the portion of the content segment by consumers that consume the portion of the content segment on the second platform. System 100 may learn from tracking consumer response to the portion of the content segment by consumers that consume the portion of the content segment on the second platform in order to predict selecting a portion of a second content segment to distribute to the second platform. For example, if a portion of a content segment including a Disney star distributed to a particular second platform attracted a high volume of consumers to the first platform, many of whom viewed the entire length of the content segment, a portion of a second content segment featuring the same or different Disney star may be distributed to that particular second platform. This example is not meant to be limiting, as any portion of any second content segment may be distributed to the second platform based upon the retention metric for the second content segment and the tracking of consumer response to the portion of the content segment by consumers that consume the portion of the content segment on the second platform.

Figure 3:
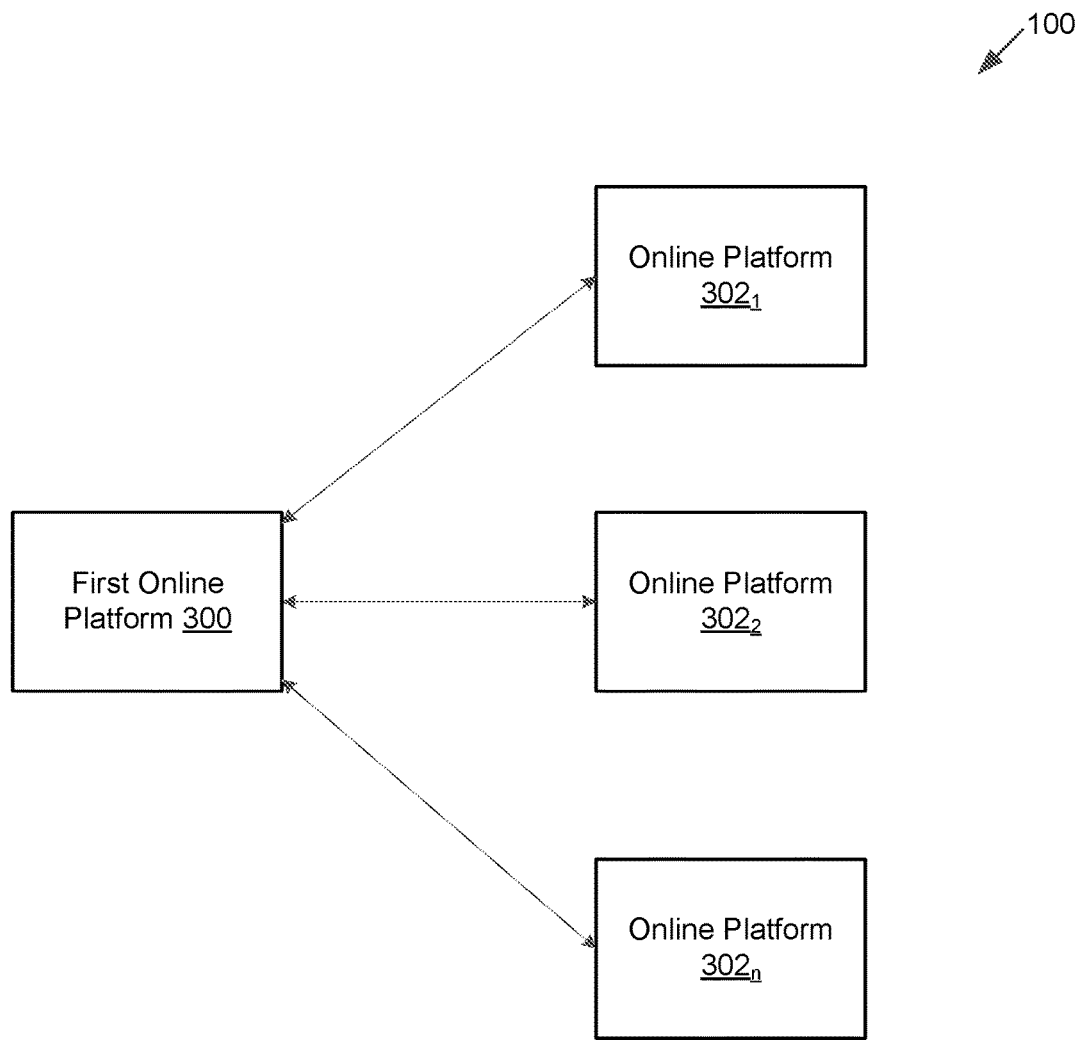
FIG. 3 illustrates an exemplary view of an implementation of the system of FIG. 1.

Referring to FIG. 3, an exemplary view of an implementation of the system of FIG. 1 is depicted. A content segment may be available for consumers to view on first online platform 300. A portion of the content segment to distribute to one or more online platforms $302_1, 302_2, \ldots, 302_n$ (collectively second platform 302) may be determined. The determination may be based upon a retention metric quantifying consumer engagement during the content segment (see FIG. 2). The portion of the content segment may be determined and distributed to one or more second platforms 302 in order to direct consumers back to the original content segment on first platform 300. The determination may be based upon one or more parameters, including talent associated with the content segment, consumer demographics associated with the content segment, a topic associated with the content segment, identification of second platform 302, and/or other parameters. Once distributed, consumer response to the portion of the content segment that has been published and/or posted to individual second platforms 302 may be tracked. Tracking consumer response to the portion of the content segment that has been distributed to individual second platforms 302 may include one or more of tracking whether the consumers subsequently consume the content segment on first platform 300, tracking whether the consumers subsequently respond to a call to action within the content segment on first platform 300, tracking an amount of the content segment on first platform 300 that has been consumed by the individual consumers, and/or tracking whether individual consumers subsequently consume the content segment on first platform 300 and then proceed to view related content segments on first platform 300. Based on this information, system 100 may then determine a portion of a second content segment to distribute to individual second platforms 302 to direct consumers to the second content segment on first platform 300.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 4:
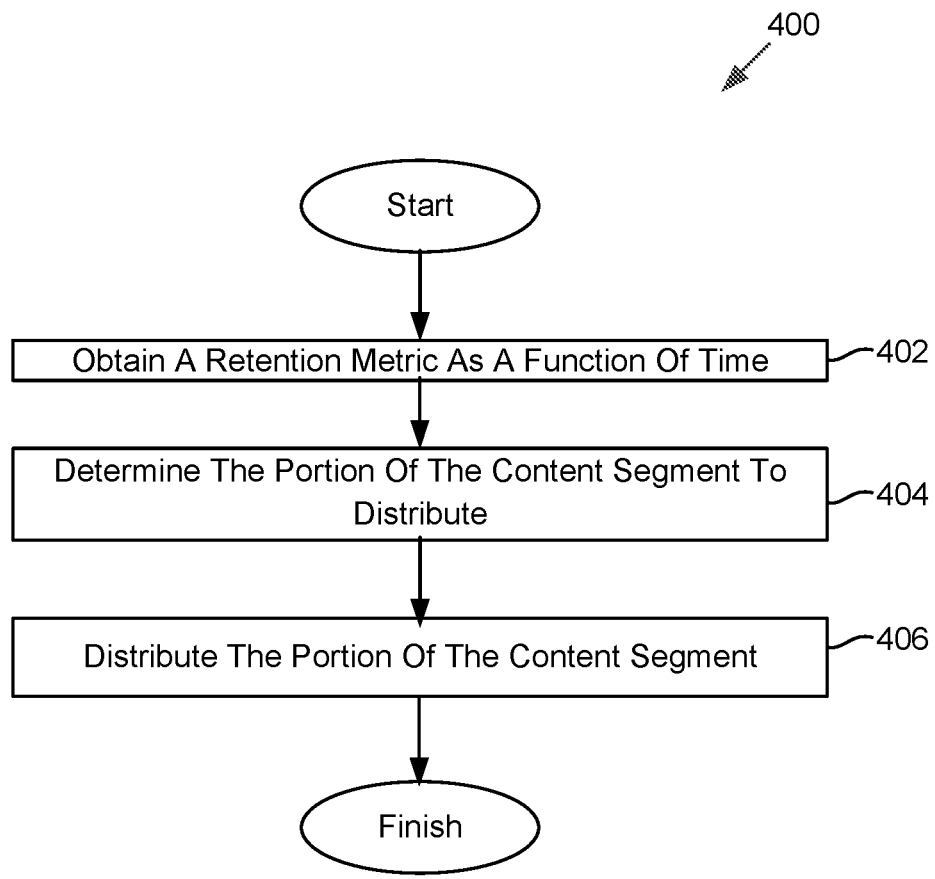
FIG. 4 illustrates a method for selecting a portion of a content segment to distribute via an online platform, in accordance with one or more implementations.

FIG. 4 illustrates a method 400 for selecting a portion of a content segment to distribute via an online platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a retention metric may be obtained. The retention metric may be a function of time for the content segment. The retention metric may quantify consumer engagement during the content segment. The content segment may be available to consumers via a first online platform. Operation 402 may be performed by a metric component that is the same as or similar to metric component 106, in accordance with one or more implementations.

At an operation 404, the portion of the content segment to distribute via a second online platform to direct consumers to the content segment on the first platform may be determined. The determination may be based upon the retention metric. Operation 404 may be performed by a content determination component that is the same as or similar to content determination component 108, in accordance with one or more implementations.

At an operation 406, the portion of the content segment may be distributed via the second platform. Operation 406 may be performed by a content distribution component that is the same as or similar to content distribution component 110, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for selecting a portion of a content segment to distribute via an online platform, the system comprising:
   one or more physical computer processors configured by computer readable instructions to:
   obtain values of a metric as a function of progress through the content segment, wherein the content segment is available to consumers via a first online platform, and wherein the value of the metric characterizes audience engagement with the content segment;
   determine a portion of the content segment to distribute via a second online platform, wherein the determination is based upon the values of the metric as a function of progress through the content segment;
   effectuate distribution of the portion of the content segment via the second online platform;
   track consumer response to the portion of the content segment by consumers that consume the portion of the content segment on the second platform; and
   wherein tracking consumer response to the portion of the content segment by consumers that consume the portion of the content segment on the second platform includes tracking whether the consumers that consume the portion of the content segment on the second platform subsequently consume the content segment on the first platform.

2. The system of claim 1, wherein the one or more physical processors are further configured by computer-readable instructions such that determining the portion of the content segment is based upon talent associated with the content segment.

3. The system of claim 1, wherein the one or more physical processors are further configured by computer-readable instructions such that determining the portion of the content segment is based upon consumer demographics associated with the content segment.

4. The system of claim 1, wherein the one or more physical processors are further configured by computer-readable instructions such that determining the portion of the content segment is based upon a topic associated with the content segment.

5. The system of claim 1, wherein the one or more physical processors are further configured by computer-readable instructions such that determining the portion of the content segment is based upon identification of the second platform.

6. The system of claim 1, wherein the one or more physical processors are further configured by computer-readable instructions to:
   track consumer generated content on one or more online platforms other than the first platform.

7. A system for selecting a portion of a content segment to distribute via an online platform, the system comprising:
   one or more physical computer processors configured by computer readable instructions to:
   obtain values of a metric as a function of progress through the content segment, wherein the content segment is available to consumers via a first online platform, and wherein the value of the metric characterizes audience engagement with the content segment;
   determine a portion of the content segment to distribute via a second online platform, wherein the determination is based upon the values of the metric as a function of progress through the content segment;
   effectuate distribution of the portion of the content segment via the second online platform;
   track consumer response to the portion of the content segment by consumers that consume the portion of the content segment on the second platform; and
   wherein tracking consumer response to the portion of the content segment by consumers that consume the portion of the content segment on the second platform includes tracking whether the consumers that consume the portion of the content segment on the second platform subsequently respond to a call to action within the content segment on the first platform.

8. The system of claim 7, tracking consumer response to the portion of the content segment by consumers that consume the portion of the content segment on the second platform further includes tracking an amount of the content segment consumed by the individual consumers that consume the portion of the content segment on the second platform.

9. A system for selecting a portion of a content segment to distribute via an online platform, the system comprising:
   one or more physical computer processors configured by computer readable instructions to:
   obtain values of a metric as a function of progress through the content segment, wherein the content segment is available to consumers via a first online platform, and wherein the value of the metric characterizes audience engagement with the content segment;
   determine a portion of the content segment to distribute via a second online platform, wherein the determination is based upon the values of the metric as a function of progress through the content segment;
   effectuate distribution of the portion of the content segment via the second online platform;
   track consumer response to the portion of the content segment by consumers that consume the portion of the content segment on the second platform; and
   wherein tracking consumer response to the portion of the content segment by consumers that consume the portion of the content segment on the second platform includes tracking whether individual consumers that consume the portion of the content segment on the second platform and subsequently consume the content segment on the first platform then proceed to consume related content segments on the first platform.

10. The system of claim 9, wherein the one or more physical processors are further configured by computer-readable instructions to:
obtain values of the metric as a function of progress through a second content segment on the first platform; and
determine a portion of the second content segment to distribute via the second platform, wherein the determination is based upon the values of the metric as a function of progress through the second content segment and the tracking of consumer response to the portion of the content segment by consumers that consume the portion of the content segment on the second platform.

11. A system for selecting an online platform to distribute a portion of a content segment on, the system comprising:
one or more physical computer processors configured by computer readable instructions to:
obtain values of a metric as a function of progress through the content segment, wherein the content segment is available to consumers via a first online platform, and wherein the metric characterizes audience engagement with the content segment;
determine a portion of the content segment to distribute via a second online platform, wherein the determination is based upon the values of the metric as a function of progress through the content segment;
determine the second online platform to distribute the portion of the content segment, wherein the determination is based upon the portion of the content segment; and
effectuate distribution of the portion of the content segment via the second online platform.

12. The system of claim 11, wherein the one or more physical processors are further configured by computer-readable instructions such that determining the second platform is based upon talent associated with the content segment.

13. The system of claim 11, wherein the one or more physical processors are further configured by computer-readable instructions such that determining the second platform is based upon consumer demographics associated with the second platform.

14. The system of claim 11, wherein the one or more physical processors are further configured by computer-readable instructions such that determining the second platform is based upon a topic associated with the content segment.

15. The system of claim 11, wherein the one or more physical processors are further configured by computer-readable instructions such that determining the second platform is based upon a length of time of the portion of the content segment.

16. The system of claim 11, wherein the one or more physical processors are further configured by computer-readable instructions to:
track consumer response to the portion of the content segment by consumers that consume the portion of the content segment on the second platform.

17. The system of claim 16, wherein tracking response to the portion of the content segment by consumers that consume the portion of the content segment on the second platform includes tracking whether the consumers that consume the portion of the content segment on the second platform subsequently consume the content segment on the first platform.

18. The system of claim 16, wherein tracking response to the portion of the content segment by consumers that consume the portion of the content segment on the second platform includes tracking whether the consumers that consume the portion of the content segment on the second platform subsequently respond to a call to action within the content segment on the first platform.

19. The system of claim 16, wherein the one or more physical processors are further configured by computer-readable instructions to:
obtain values of the metric as a function of progress through a second content segment on the first platform; and
determine a portion of the second content segment to distribute via the second platform, wherein the determination being based upon the values of the metric as a function of progress through the second content segment and the tracking of consumer response to the portion of the content segment by consumers that consume the portion of the content segment on the second platform.

20. The system of claim 11, wherein the one or more physical processors are further configured by computer-readable instructions to:
track consumer generated content on one or more online platforms other than the first platform.

* * * * *